(12) United States Patent
Fan et al.

(10) Patent No.: US 8,526,913 B2
(45) Date of Patent: *Sep. 3, 2013

(54) SYSTEMS, METHODS, AND COMPUTER PROGRAM PRODUCTS FOR MANAGING ACCESS TO FEMTOCELL COVERAGE

(71) Applicant: AT&T Intellectual Property I, LP, Atlanta, GA (US)

(72) Inventors: James Fan, San Ramon, CA (US); Richard Kuo, Mountain View, CA (US); Cheng P Liu, Duluth, GA (US)

(73) Assignee: AT&T Intellectual Property I, L.P., Atlanta, GA (US)

( * ) Notice: Subject to any disclaimer, the term of this patent is extended or adjusted under 35 U.S.C. 154(b) by 0 days.

This patent is subject to a terminal disclaimer.

(21) Appl. No.: 13/647,019

(22) Filed: Oct. 8, 2012

(65) Prior Publication Data

US 2013/0045712 A1 Feb. 21, 2013

Related U.S. Application Data

(63) Continuation of application No. 12/906,277, filed on Oct. 18, 2010, now Pat. No. 8,295,882.

(51) Int. Cl.
*H04M 1/66* (2006.01)

(52) U.S. Cl.
USPC .......................... 455/410; 455/411; 455/435.1

(58) Field of Classification Search
USPC ................... 455/414.1, 415, 418, 422.1, 425, 455/435.1, 443, 444, 445, 449, 558, 410, 455/411, 433; 370/310, 310.2, 312, 328, 370/338; 379/93.02, 93.03, 93.23, 114.14, 379/142.05, 204.01; 726/1–36
See application file for complete search history.

(56) References Cited

U.S. PATENT DOCUMENTS

| | | | |
|---|---|---|---|
| 6,125,353 A | 9/2000 | Yagasaki | |
| 6,587,835 B1 | 7/2003 | Treyz et al. | |
| 6,690,659 B1 | 2/2004 | Ahmed et al. | |
| 6,845,361 B1 | 1/2005 | Dowling | |
| 7,149,541 B2 | 12/2006 | Rautila | |
| 2006/0258334 A1 | 11/2006 | Tarallo | |
| 2007/0001904 A1 | 1/2007 | Mendelson | |
| 2007/0242809 A1 | 10/2007 | Mousseau et al. | |
| 2008/0040240 A1 | 2/2008 | Covington et al. | |
| 2009/0094680 A1 | 4/2009 | Gupta et al. | |
| 2009/0286544 A1 | 11/2009 | Huber et al. | |
| 2009/0288139 A1 | 11/2009 | Huber et al. | |
| 2009/0305671 A1 | 12/2009 | Luft et al. | |
| 2010/0041402 A1 | 2/2010 | Gallagher et al. | |
| 2010/0056144 A1 | 3/2010 | Gallagher et al. | |
| 2010/0153816 A1 | 6/2010 | Li et al. | |
| 2010/0173630 A1 | 7/2010 | Han et al. | |
| 2011/0034182 A1* | 2/2011 | Issa et al. | 455/456.3 |
| 2011/0113068 A1 | 5/2011 | Ouyang et al. | |

* cited by examiner

*Primary Examiner* — Wesley Kim
*Assistant Examiner* — Dinh P Nguyen
(74) *Attorney, Agent, or Firm* — Parks IP Law LLC; Mickki D. Murray, Esq.

(57) ABSTRACT

Systems, methods, and computer program products are for managing access to a femtocell coverage area. An exemplary method includes storing in a memory component a first identifier corresponding to a subscribed service of a communication device and a second identifier corresponding to a user of the communication device, and granting access to the femtocell coverage area using the second identifier.

17 Claims, 13 Drawing Sheets

SYSTEMS, METHODS, AND COMPUTER PROGRAM PRODUCTS FOR MANAGING ACCESS TO FEMTOCELL COVERAGE

TECHNICAL FIELD

The embodiments presented herein relate generally to wireless communications and, more particularly, to systems, methods, and computer program products for managing access to femtocell coverage.

BACKGROUND

Mobile network operators (MNOs) have shown increasing interest in improving wireless coverage in indoor environments through the use of femtocell base stations. Femtocell base stations send and receive signals from user devices using the same licensed frequencies as the native access technology used by an MNO for their macrocell network. A femtocell base station is typically communicatively coupled to a broadband network to facilitate routing of communications to and from the MNO's network.

The most common application of femtocell base station deployment is in MNO subscriber's homes, although MNOs are now deploying femtocell base stations in larger indoor environments, such as shopping malls, sport venues, and the like, in which less than optimal coverage may be experienced by subscribers through the MNO's macrocell network. In these environments, femtocell base stations are often deployed in a cluster architecture to allow call handover with neighboring femtocell base stations.

SUMMARY

According to one exemplary embodiment, a method for managing access to a femtocell coverage area includes storing in a memory component a first identifier corresponding to a subscribed service of a communication device and a second identifier corresponding to a user of the communication device, and granting access to the femtocell coverage area using the second identifier.

In one embodiment, the method further includes, prior to storing the first identifier and the second identifier, receiving information related to the communication device that indicates the communication device is in the femtocell coverage area, temporarily granting access to the femtocell coverage area using the first identifier to facilitate selection of the second identifier, and selecting the second identifier. In one embodiment, selecting the second identifier includes generating a second identifier request and sending the second identifier request to the communication device. The second identifier request is then routed to the communication device using the first identifier. In this embodiment, receiving in response to the second identifier request a second identifier response includes one of (i) a selection of the second identifier, wherein the selection is of a specific identifier selected from a second identifier list sent to the communication device as the second identifier request, and (ii) a user-created code comprising at least one alphanumeric character to be used as the second identifier. In another embodiment, selecting the second identifier includes selecting the second identifier from a plurality of unassigned identifiers stored in the memory component, wherein the plurality of unassigned identifiers are generated by at least one of the following: (i) a mobile network operator (MNO) associated with the femtocell coverage area, (ii) a first establishment associated with the femtocell coverage area, and (iii) a second establishment associated with the first establishment. In one embodiment, the MNO is associated with the femtocell coverage area and provides the subscribed service to the communication device. In another embodiment, the first establishment provides the femtocell coverage area independent of the MNO. In another embodiment, the first establishment is a shopping mall and the second establishment is a particular establishment within the mall. In yet another embodiment, the second identifier provides a first temporary ID of the user for communicating with at least one of the first establishment and the second establishment.

In one embodiment, the method further includes selecting at least a third identifier, wherein the second identifier provides a first temporary ID of the user for communicating with a first establishment, and the third identifier provides a second temporary ID of the user for communicating with a second establishment. In one embodiment, the first and second establishments are located within a multi-establishment location including, for example, one of a mall, a fair, a circus, an amusement park, a multi-vendor market, and a grocery market.

In one embodiment, granting access to the femtocell coverage area using the second identifier includes one of: (i) granting access to the femtocell coverage area for communications originating from and terminating within the femtocell coverage area, (ii) granting access to the femtocell coverage area for communications originating from within the femtocell coverage area and terminating external to the femtocell coverage area, (iii) facilitating local routing of communications between the communication device and at least one device located within the femtocell coverage area, wherein the at least one device includes a second communication device associated with one of a second user and an establishment, and wherein the local routing of the communications occurs within the femtocell coverage area, and the second identifier is used for the local routing, and (iv) facilitating external routing of communications between the communication device and at least one device located within the femtocell coverage area, wherein the at least one device includes a second communication device associated with one of a second user and an establishment, and the external routing of the communications occurs via an external network provided via the subscribed service, and the first identifier is used for the external routing.

According to another exemplary embodiment, a femtocell access system for managing access to a femtocell coverage area includes at least one femtocell base station, a processing component, and a memory component in communication with the processing component, the memory component being configured to store instructions that, when executed by the processing component, perform any aforementioned method.

According to yet another exemplary embodiment, a tangible, non-transitory computer-readable medium includes computer-executable instructions that, when executed by a processor, cause the processor to perform any aforementioned method.

DETAILED DESCRIPTION

Figure 1:
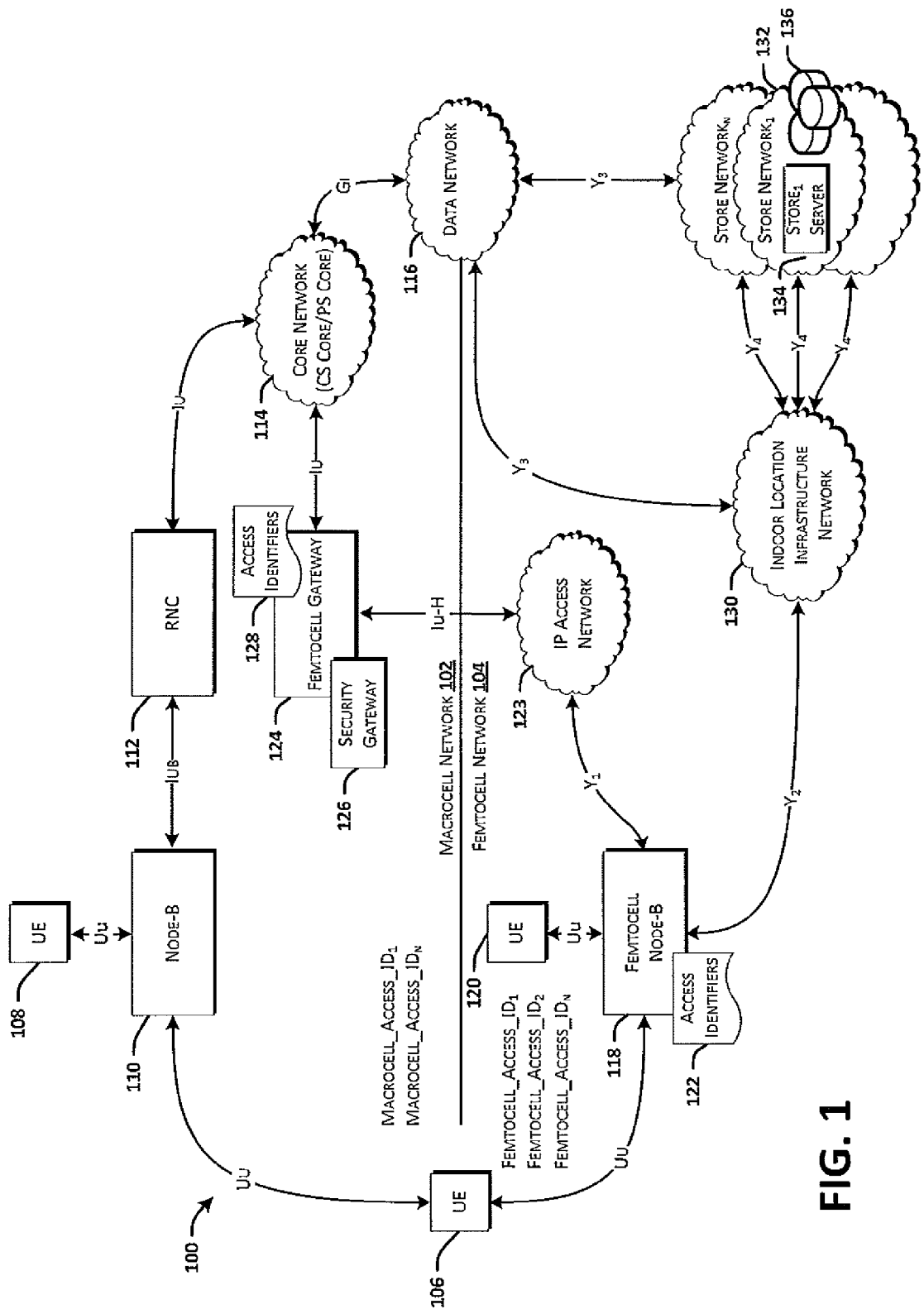
FIG. 1 schematically illustrates an exemplary environment in which various embodiments disclosed herein may be implemented.

As required, detailed embodiments are disclosed herein. It must be understood that the disclosed embodiments are merely exemplary examples that may be embodied in various and alternative forms, and combinations thereof. As used herein, the word "exemplary" is used expansively to refer to embodiments that serve as an illustration, specimen, model or pattern. The figures are not necessarily to scale and some features may be exaggerated or minimized to show details of particular components. In other instances, well-known components, systems, materials, or methods have not been described in detail in order to avoid obscuring the embodiments disclosed herein. Therefore, specific structural and functional details disclosed herein are not to be interpreted as limiting, but merely as a basis for the claims and as a representative basis for teaching one skilled in the art to variously employ the disclosed embodiments.

While the processes or methods described herein may, at times, be described in a general context of computer-executable instructions, the present methods, procedures, and processes can also be implemented in combination with other program modules and/or as a combination of hardware and software. The term application, or variants thereof, is used expansively herein to include routines, program modules, programs, components, data structures, algorithms, and the like. Applications can be implemented on various system configurations, including servers, network nodes, single or multiple processor computers, hand-held computing devices, mobile devices, microprocessor-based consumer electronics, programmable electronics, network elements, gateways, network functions, devices, combinations thereof, and the like.

The systems, devices, methods, and computer program products described herein may be implemented in wireless networks that use exemplary telecommunications standards, such as Global System for Mobile communications (GSM) and a Universal Mobile Telecommunications System (UMTS). It should be understood, however, alternatively or additionally, the systems, devices, methods, and computer program products may be implemented in wireless networks that use any existing, developing, or yet to be developed telecommunications technologies. Some examples of other suitable telecommunications technologies include, but are not limited to, networks utilizing Time Division Multiple Access (TDMA), Frequency Division Multiple Access (FDMA), Wideband Code Division Multiple Access (WCDMA), CDMA2000, Orthogonal Frequency Division Multiplexing (OFDM), Long Term Evolution (LTE), and various other 2G, 2.5G, 3G, 4G, and greater generation technologies. Examples of suitable data bearers include, but are not limited to, General Packet Radio Service (GPRS), Enhanced Data rates for Global Evolution (EDGE), the High-Speed Packet Access (HSPA) protocol family such as High-Speed Downlink Packet Access (HSDPA), Enhanced Uplink (EUL) or otherwise termed High-Speed Uplink Packet Access (HSUPA), Evolved HSPA (HSPA+), and various other current and future data bearers. An exemplary environment 100 in which the various exemplary embodiments disclosed herein may be implemented is now described with reference to FIG. 1.

Exemplary Network Architecture

The illustrated environment 100 includes a macrocell network 102 and a femtocell network 104. The macrocell network 102 includes a plurality of macrocells configured in accordance with Third Generation Partnership Project (3GPP) and, particularly, UMTS, although alternative network configurations are contemplated as described above. The macrocell network 102 provides wireless services to postpaid and/or prepaid customers, hereinafter referred to collectively as subscribers. The wireless services provided by the macrocell network 102 are referred to hereinafter as subscribed services and may encompass, for example, voice, messaging, and/or data services. The particular subscribed service(s) of a given subscriber may vary based upon service agreements established between the subscriber and a mobile network operator (MNO) operating the macrocell network 102. The MNO may engage in inter-operator agreements with one or more other MNOs to permit roaming subscribers to utilize the macrocell network 102. The MNO may also operate the femtocell network 104, establish inter-operator agreements with other MNOs for use of the femtocell network 104, or establish agreements with another entity, such as an establishment owner (e.g., an owner and/or operator of a restaurant, a store, a service company, a mall, a fair, a sport venue, a circus, an amusement park, a multi-vendor market, a grocery market, or other indoor/outdoor location in which the femtocell network 104 is deployed).

Each subscriber accesses their subscribed service(s) via a user equipment (UE) 106. The UE 106 may include a wireless phone, a wireless-enabled computer, such as a tablet computer, netbook, or notebook, or another type of mobile device such as a portable gaming system or personal digital assistant configured to wirelessly communicate with the macrocell network 102 and the femtocell network 104, as described in greater detail herein.

The UE 106 is configured to communicate with the macrocell network 102 to access a subscribed service. Moreover, the UE 106 is configured to communicate with the femtocell network 104 using the same access technology used to communicate with the macrocell network 102, which technology, in the illustrated embodiment, is UMTS. An exemplary mobile communication device, such as the illustrated UE 106, and components thereof are described below in greater detail with reference to FIG. 2.

In the illustrated embodiment, the UE 106 is associated with one or more macrocell network access identifiers (illustrated as MACROCELL_ACCESS_ID$_1$ and MACROCELL_ACCESS_ID$_N$) for communicating with the macrocell network 102. A macrocell network access identifier includes, for example, a Mobile Station International Subscriber Directory Number (MSISDN). An MSISDN is a dialable number allocated to the subscriber associated with the UE 106. The MSISDN is used for communications directed to the UE 106 and, particularly, for example, initial routing of communications from an originating device, such as the UE 108, or other device within the macrocell network 102, the femtocell network 104, the Internet, or the public switched telephone network (PSTN, not illustrated). The UE 106, in one embodiment, is configured to store macrocell access IDs (e.g., multiple MSISDNs in a subscriber identity module (SIM)) such that communications directed to any MSISDN associated with the UE 106 will be routed to the UE 106. Each MSISDN is structured in compliance with the international ISDN numbering plan. Accordingly, each MSISDN includes a country code (CC) of up to three decimal places, a national destination code (NDC) of two or three decimal places, and a subscriber number (SN) of up to a maximum ten decimal places.

In some embodiments, the macrocell access ID includes an International Mobile Subscriber Identity (IMSI) or temporary IMSI (T-IMSI). The IMSI is a unique non-dialable number allocated to a subscriber and the services provided to the subscriber with the macrocell network 102. The IMSI is typically stored in a SIM, or universal SIM (U-SIM) in UMTS networks, that is installed in the UE 106. The macrocell network 102 can use the IMSI for paging the UE 106 in mobile-terminated calls, although a T-IMSI is typically used to protect the identity of the subscriber. The IMSI includes a maximum of fifteen decimal places divided among a mobile country code (MCC), a mobile network code (MNC), and a mobile subscriber identification number (MSIN). The MCC includes three decimal places to identify the operating country of the subscriber associated with the IMSI. The MNC includes two decimal places to identify the network within the operating country to which the IMSI is registered. The MSIN includes a maximum of ten decimal places to uniquely identify the subscriber in the home public land mobile network (HPLMN).

As used herein, a macrocell access ID generally refers to an identifier corresponding to a subscribed service of a communication device, such as the UE 106. The subscriber is capable of initiating and receiving communications (e.g., voice, data, and/or messaging) with other UEs, PSTN devices such as wireline telephones, and Internet Protocol (IP) devices such as Voice-over-IP (VoIP) telephones, among others, via the macrocell network 102 using a macrocell access ID. The UE 106 is also configured to communicate with the femtocell network 104 using a macrocell access ID. When communicating with the femtocell network 104 using a macrocell access ID, the femtocell network 104 serves as an extension of the macrocell network 102 for facilitating access to the subscriber's subscribed services when the UE 106 is in a location served by the femtocell network 104 where the macrocell network 102 is not available, or signal strength from the macrocell network 102 is less than optimal resulting in dropped calls, poor voice quality, low data rates, high latency, and other undesirable characteristics of low signal strength.

The UE 106 is also configured to communicate with the femtocell network 104 using one or more femtocell network access identifiers (illustrated as FEMTOCELL_ACCESS_ID$_1$, FEMTOCELL_ACCESS_ID$_2$, and MACROCELL_ACCESS_ID$_N$). A femtocell access ID identifies a user of the UE 106 to the femtocell network 104. Moreover, a femtocell access ID only permits routing of communications information (e.g., voice, data, and messaging) within the femtocell network 104 to protect the identity of the user of the UE 106 during communications initiated/received when the UE 106 is present in a coverage area of the femtocell network 104.

In some embodiments, the user of the UE 106 is the subscriber associated with the UE 106 and one or more subscribed services of the macrocell network 102. In other embodiments, the user of the UE 106 is a friend, family member, or other user authorized by the subscriber to use the UE 106 for communications within the femtocell network 104. In any case, the femtocell access ID corresponds to the actual user of the UE 106 at a given time and is independent of the UE 106 itself. That is, a particular user may access the femtocell network 104 via the UE 106 or other compatible device using their femtocell access ID. For example, a child may use either of their parent's UEs for access to the femtocell network 104 using a femtocell access ID that is particular to the child. Likewise, a single user may have multiple femtocell access IDs for accessing the femtocell network 104 under varying conditions. For example, the user may use a first femtocell access ID for communications with a customer service representative of a store within the femtocell network 104, a second femtocell access ID for communications with other individuals within the femtocell network 104, and a third femtocell access ID for communications with still other individuals within the femtocell network 106. Femtocell network access via a femtocell access ID is described in greater detail herein.

In one embodiment, a femtocell access ID is selected by a user per the user's discretion. By way of example, the user may select a femtocell access ID from a plurality of femtocell access IDs that are presented to the user as a visual and/or audible list via the UE 106. By way of further example, the user may create a code consisting of at least one alphanumeric character and/or symbol to be used as their femtocell access ID. This selection may be repeated for multiple femtocell access IDs.

In another embodiment, the femtocell access ID is assigned to the user of the UE 106 by the MNO of the macrocell network 102, a femtocell network operator that may be the MNO or another operator, such as an establishment accessible via the macrocell network 102 and/or the femtocell network 104.

Femtocell access IDs can be stored in the SIM/U-SIM of the UE 106 and/or a memory of the UE 106. In one embodiment, a femtocell access ID appears to the femtocell network 104 as a special-purpose MSISDN for use only with communications (e.g., voice, data, and/or messaging) originating and terminating within the femtocell network 104. For example, communications between the UE 106 and other devices operating within the femtocell network 104, or communications between the UE 106 and various stores, servers, databases, and the like, as is described in greater detail herein.

In one embodiment, the macrocell access ID is used for initial communication with the femtocell network 104 prior to one or more femtocell access IDs being assigned to the user of the UE 106, whom may be the subscriber or another individual, as described above. For example, upon entering a coverage area provided by the femtocell network 104, the femtocell network 104 detects the UE 106 and prompts the user of the UE 106 to select or create a femtocell access ID. On subsequent attempts to communicate with the femtocell network 104, the femtocell network can recognize the UE 106 and assign a previously-used femtocell access ID, permit selection of at least one additional femtocell access ID, and/or permit selection of a replacement femtocell access ID for the previously-used femtocell access ID. In any case, upon selection of a femtocell access ID, communications between the UE 106 and other devices, servers, databases, etc. are routed using the selected femtocell access ID, thereby protecting the macrocell network access identifier (e.g., the subscriber's MSISDN associated with the UE 106) from being intercepted, viewed, or otherwise disclosed to others in the femtocell network 104. In some embodiments, upon the femtocell NB 118 no longer detecting presence of the UE 106, the femtocell NB 118 may remove the femtocell access ID from the access identifier. Removal may be temporary or permanent. Particular components of the macrocell network 102 and the femtocell network 104 are now described.

The UE 106 communicates with a node-b (NB) 110 via a Uu interface. Other UEs, such as UE 108 may also communicate with the NB 110 via a Uu interface. The NB 110 is the terminating node for radio access in the macrocell network 102. The NB 110 includes one or more transceivers for the transmission and reception of communications information (e.g., voice, data, and/or messaging) across the Uu interface. One NB is illustrated for simplicity, although multiple NBs are contemplated for actual implementations of the macrocell network 102. The NB 110, alone or in combination with one or more other NBs, is communicatively coupled to a radio network controller (RNC) 112 via an Iub interface. The RNC 112 is configured to allocate radio resources to the UEs 106, 108 and other UEs (not illustrated), administer frequencies, and control handovers between the NB 110 and other NBs (not illustrated). Although illustrated as a distinct network element, the RNC 112 may, alternatively, be integrated with the NB 110 as an evolved NB/RNC architecture, such as an evolved-NB in LTE-based macrocell networks. Only one RNC 112 is illustrated for simplicity.

The RNC 112 is in communication with a core network 114 via an Iu interface. The core network 114 includes circuit core network elements including, for example, one or more mobile switching centers (MSCs), which communicate with the RNC 112 using an Iu-CS interface (not illustrated). The core network 114 also includes packet core network elements including, for example, one or more serving GPRS support nodes (SGSNs), which communicate with the RNC 112 via an Iu-PS interface (not illustrated). The core network 114 may also include one or more gateway GPRS support nodes (GGSNs) for facilitating data communications with a data network 116, such as the Internet or other public data network (PDN). The GGSNs communicate with the data network 116 via a Gi interface. The core network 114 may also include, for example, location registers such as home location registers (HLRs) and visiting location registers (VLR) as well as authentication centers (AuCs) and equipment identity registers (EIRs), among other nodes.

The illustrated environment 100 does not show MNO support management systems such as policy servers, service provisioning servers, billing servers, application servers, performance servers, and the like. These and like systems may be in communication with the core network 114 or other illustrated network elements via known interfaces.

The illustrated network elements of the macrocell network 102 are particular to a UMTS network, although similar elements may be used in alternative embodiments that use GSM, CDMA2000, LTE, various combinations thereof, or other technologies, such as those provided above.

The UE 106 also communicates with a femtocell node-b (NB) 118 via a Uu interface. The femtocell NB 118 may alternatively be termed herein as a home NB, a femtocell access point, or HeNode-B. It should be understood that these terms are used interchangeably herein, although particular terms are often used to describe femtocell base stations used in certain network types, such as home NB or femtocell node-b for UMTS, femtocell access point for CDMA2000, and HeNode-B for LTE.

The femtocell NB 118 provides node-B radio access functionality to the femtocell network 104. One femtocell NB 118 is shown for simplicity, although multiple femtocell NBs are contemplated and likely preferable in some implementations to facilitate access to the femtocell network 104 by a plurality of UEs including, for example, the UE 106, the UE 120, and other devices, servers, databases, and the like within the femtocell network 104. The femtocell NB 118 may also function as a radio network controller within the femtocell network 104 and, accordingly, perform similar functions as the RNC 112, described above, for local routing of communications originating within and terminating within the femtocell network 104.

In one embodiment, the femtocell NB 118 includes one or more antennas communicatively coupled to one or more transceivers which, in turn, are communicatively coupled to one or more processors and memory components to perform the various functions of a femtocell base station. In the illustrated embodiment, the femtocell NB 118 includes an access identifier list 122. The femtocell access ID list 122, in one embodiment, is a whitelist including one or more approved femtocell access IDs associated with the UE 106 and/or other devices such as the UE 120. The femtocell access ID list 122 may also include one or more macrocell access IDs associated with a particular UE, such as the UE 106, and one or more femtocell access IDs associated with users of that particular UE. An exemplary femtocell base station, such as the femtocell NB 118, and components thereof is described in detail below with reference to FIG. 3.

The femtocell NB 118 is in communication with an IP access network 123 via an exemplary $Y_1$ interface. The IP access network 123, in one embodiment, includes a broadband Internet service provider (ISP) access component such as a cable or DSL modem, an optical network terminal and fiber optic router, and/or other routing components to facilitate broadband network access. The IP access network 123 is in communication with a femtocell gateway 124 via an Iu-H interface. The femtocell gateway 124 concentrates connections from the femtocell NB 118 and, potentially, one or more other femtocell NBs (not illustrated). The femtocell gateway 124 communicates with the core network 114 via an Iu interface and, for routing purposes, appears to the core network 114 as an RNC, for example, like the RNC 112 serving one or more femtocell NBs including the illustrated femtocell NB 118. The femtocell gateway 124 may be in communication with a femtocell NB management system (not illustrated) that is used for provisioning femtocell NB configuration data remotely using a remote management protocol, such as technical report 069 (T-069) standard defined by the Broadband Forum. Other remote management protocols are contemplated.

In one embodiment, the femtocell gateway 124 includes a security gateway 126 as illustrated. In another embodiment, the security gateway 126 is a distinct network element that is in communication with the femtocell gateway 124. The security gateway 126, in one embodiment, uses a secure protocol suite such as Internet Protocol Security (IPSec) to provide a secure link between the femtocell NB 118 and the femtocell gateway 124. In embodiments that use a femtocell NB management system, as described above, the security gateway 126 also provides a secure link between the femtocell NB 118 and that system. Moreover, in these embodiments, the secure link may be a dedicated link to either connection or may be shared for both connections.

The femtocell gateway 124 includes one or more transceivers which, in turn, are communicatively coupled to one or more processors and memory components to perform the various functions described herein. In one embodiment, the femtocell gateway 124 is configured to store, in a memory component, a central femtocell access ID list 128. In one embodiment, the central femtocell access ID list 128 is a central whitelist including the macrocell access IDs and/or the femtocell access IDs for the UEs that access the femtocell NB 118 and one or more femtocell NBs in the femtocell network 104. Moreover, the central femtocell access ID list 128 may be used in lieu of the femtocell access ID list 122 stored in the femtocell NB 118 or in addition to the femtocell access ID list 122.

Although the femtocell gateway 124 is illustrated as serving the femtocell network 104, the femtocell gateway 124 may also perform inter-network gateway functions for the macrocell network 102 to other femtocell networks in addition to the illustrated femtocell network 104. The femtocell networks may be individually owned and/or operated by an entity other than the MNO of the macrocell network 102 or by the MNO, as described above.

In the illustrated embodiment, the femtocell NB 118 is in communication with an indoor location infrastructure network 130 via an exemplary $Y_2$ interface that, in turn, is in communication with one or more store networks 132 via a $Y_3$ interface. In one embodiment, the indoor location infrastructure network 130 is a private communications network (e.g., a private local area network, intranet) of an indoor mall and is configured to facilitate communications between the UE 106 and the publically-accessible portions of the store networks 132, such as for placing orders for products, communicating with customer service representatives, searching product inventory per store or for multiple stores at once, searching for restaurants, receiving bids for similar or the same product that is available from multiple stores, receiving coupons, redeeming coupons, managing customer information, and the like. In one embodiment, the infrastructure network 130 is externally accessible via the data network 116 (e.g., the Internet) via a webpage. In another embodiment, the infrastructure network 130 is internally accessible via the femtocell NB 118 directly (e.g., via the illustrated $Y_2$ interface) or via the data network 116 (e.g., via the illustrated $Y_4$ interface). The infrastructure network 130, in some embodiments, also supports local routing of communications originating and terminating within the femtocell network 104.

The store networks 132 may be in communication with the data network 116 via an exemplary $Y_4$ interface. The store networks 132 may each include or share at least one store server 134 and at least one store database 136. The store server 134 may provide a locally and/or remotely accessible electronic store front, such as a website, by which a customer can search products, place orders for delivery or pickup, contact customer service representatives, rate products, review products, reserve a table (in the case the store network 132 is for a restaurant), and perform other like tasks. The store database 136 is configured to store customer data such as name, address, telephone number, purchase history, and like data. In some embodiments, the customer data includes one or more femtocell access IDs associated with a particular customer in lieu of some or all of the customer's data including his name, address, and/or telephone number, for example. In these embodiments, the customer accesses the femtocell NB 118 using a femtocell access ID to protect his or her identity from the store network 132. For example, a customer may desire to interact with a particular store, but also desire his actual telephone number to be unavailable to a store. All communications between the customer (e.g., via the UE 106) and the store network 132 are locally routed within the femtocell network 104 using the femtocell access ID and instead of the customer's macrocell access ID (e.g., the customer's MSISDN).

Exemplary Mobile Communication Device

Figure 2:
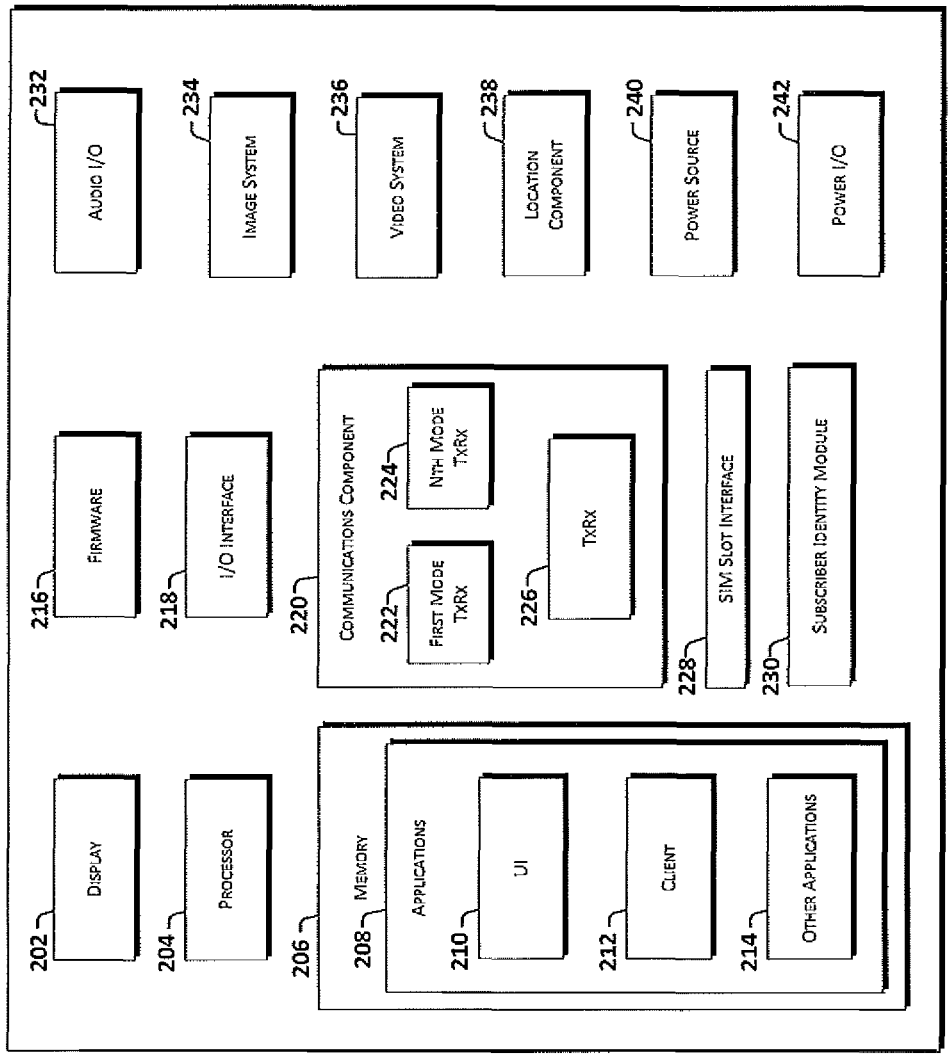
FIG. 2 schematically illustrates an embodiment of a mobile communication device and components thereof.

Referring now to FIG. 2, a schematic block diagram of an exemplary mobile communication device 200 and components thereof is illustrated. Although connections are not shown between the components illustrated in FIG. 2, the components can interact with each other to carry out device functions. In some embodiments, for example, the components are arranged so as to communicate via one or more busses (not shown). It should be understood that FIG. 2 and the following description are intended to provide a general understanding of a suitable environment in which various aspects of the disclosed embodiments can be implemented.

In some embodiments, the UEs 106, 108, 120 illustrated in FIG. 1, are configured like the illustrated mobile communication device 200, now described. In some embodiments, the mobile communication device 200 is a multimode headset configured to provide access to more than one network types including, for example, the telecommunications technologies described above and/or other technologies such as Wi-Fi™ and WiMAX™.

In some embodiments, the mobile communication device 200 includes computer-readable media, including, for example, volatile media, non-volatile media, removable media, and non-removable media. The term "computer-readable media" and variants thereof, as used herein with respect to the mobile communication device 200, refer to storage media and communication media. In some embodiments, storage media includes volatile and/or non-volatile, removable, and/or non-removable media. For example, storage media includes random access memory (RAM), read-only memory (ROM), electrically erasable programmable read-only memory (EEPROM), solid state memory or other memory technology, CD-ROM, DVD, or other optical disk-based storage, magnetic tape, magnetic disk storage or other magnetic storage devices, or any other tangible, non-transitory medium that can be used to store the desired information and that can be accessed by the mobile communication device 200.

As illustrated in FIG. 2, the mobile communication device 200 includes a display 202 for presenting multimedia such as, for example, short messaging system (SMS) messages, enhanced messaging service (EMS), multimedia messaging service (MMS) messages, customer service messages, over-the-air (OTA) messages, unstructured supplementary service data (USSD) messages, voicemail notification messages, application graphical user interfaces (GUIs), text, images, video, telephony functions, such as Caller ID data, setup functions, menus), music, metadata, wallpaper, graphics, Internet content, multicast content, broadcast content, social networking content, game content, device status, preferences settings, map and location data, profile (e.g., vibrate, silent, loud) selection, and the like.

The illustrated mobile communication device 200 also includes a processor 204 for processing data and/or executing computer-executable instructions of one or more applications 208 stored in a memory 206. In some embodiments, the application(s) 206 include a user interface (UI) application 210. The UI application 210 interfaces with a client 212 (e.g., an operating system (OS)) to facilitate user interaction with device functionality and data. In some embodiments, the client 212 is one of Symbian OS® (Symbian OS is a registered trademark of Symbian Limited, of London, England), Microsoft® Windows® Mobile OS (Microsoft and Windows are registered trademarks of the Microsoft Corporation of Redmond, Wash.), Palm webOS® (Palm WebOS is a registered trademark of the Palm Trademark Holding Company, of Sunnyvale, Calif.), Palm OS® (also a registered trademark of the Palm Trademark Holding Company), RIM® BlackBerry® OS (RIM and Blackberry are registered trademarks of Research In Motion Limited of Waterloo, Ontario, Canada), Apple® iOS (Apple and iPhone are registered trademarks of the Apple Corporation, of Cupertino, Calif.), or Google Android® OS (Android is a registered trademark of Google, Inc., of Mountain View, Calif.). These operating systems are merely exemplary of the operating systems that can be used in accordance with the embodiments disclosed herein. Other operating systems or versions of the aforementioned operating systems are contemplated.

The UI application 210 aids a user in activating service OTA, if applicable, entering message content, viewing received messages (e.g., MMS messages, SMS messages, USSD messages, OTA messages), answering/initiating calls, entering/deleting data, entering and setting user IDs and passwords for device access, configuring settings, manipulating address book content and/or settings, multimode interaction, interacting with other applications 214, and the like.

In one embodiment, the other applications 214 include an access ID application. The access ID application is configured to facilitate management of any femtocell access IDs that can be used by the mobile communication device 200 to access the femtocell network 104. It is contemplated that a user can create and delete access IDs, in accordance with the various embodiments disclosed herein, as well as assign access IDs for use in certain locations, such as when the mobile communication device 200 is in the femtocell network 104, in another femtocell network (not illustrated), and/or for communicating with particular individuals, groups of individuals, stores, groups of stores, and the like within the femtocell network 104.

In some embodiments, the other applications 214 include, for example, visual voicemail applications, messaging applications (e.g., SMS, EMS, and MMS applications), presence applications, text-to-speech applications, speech-to-text applications, add-ons, plug-ins, email applications, music applications, video applications, camera applications, location service applications (LSAs), power conservation applications, game applications, productivity applications, entertainment applications, enterprise applications, combinations thereof, and the like. The applications 208 are stored in the memory 206 and/or as a firmware 216, and are executed by the processor 204. The firmware 216 may also store code for execution during device power up and power down operations.

The mobile communication device 200 also includes an input/output (I/O) interface 218 for input/output of data such as femtocell access IDs, location information, presence status information, user IDs, passwords, and application initiation (start-up) requests. In some embodiments, the I/O interface 218 is a hardwire connection such as a USB, mini-USB, audio jack, PS2, IEEE 1394, serial, parallel, Ethernet (RJ48) port, RJ11 port, and the like. In some embodiments, the I/O interface 218 is a proprietary interface. In some embodiments, the I/O interface 218 accepts other I/O devices such as keyboards, keypads, mice, interface tethers, stylus pens, printers, solid state memory drives, touch screens, multi-touch screens, touch pads, trackballs, joysticks, directional pads, analog control sticks, microphones, remote control devices, monitors, displays (e.g., liquid crystal displays (LCDs), light emitting diode (LED) backlight LCD, and organic LED OLED) combinations thereof, and the like. It should be appreciated that the I/O interface 218 may be used for communications between the mobile communication device 200 and a network device or local device, instead of, or in addition to, a communications component 220.

The communications component 220 interfaces with the processor 204 to facilitate wired/wireless communications with external systems. Example external systems include, but are not limited to, SMS service centers (SMSCs), intranets, network databases, network storage systems, cellular networks (e.g., the macrocell network 102 and the femtocell network 104), location servers, presence servers, VoIP networks, local area networks (LANs) (e.g., the indoor location infrastructure network 130), wide area networks (WANs), metropolitan area networks (MANs), personal area networks (PANs), and other networks, network components, and systems described herein. In some embodiments, the external systems are implemented using Wi-Fi™, WiMAX™, combinations and/or improvements thereof, and the like. In some embodiments, the communications component 220 includes a multimode communications subsystem for providing cellular communications via different cellular technologies. In some embodiments, for example, a first cellular transceiver 222 operates in one mode, such as, GSM, and an Nth cellular transceiver 224 operates in a different mode, such as UMTS or LTE. While only two cellular transceivers 222, 224 are illustrated, it should be appreciated that a plurality of transceivers can be included. Moreover, a portion of or the entirety of the communications component 220 may be provided as an add-on to the mobile communication device 200. The add-on may attach or wirelessly communicate with the mobile communication device 200 via the I/O interface 218 using a standardized or proprietary communication specification.

The illustrated communications component 220 also includes an alternative communications transceiver 226 for use by other communications technologies such as, for example, Wi-Fi™, Wi-Max™, BLUETOOTH, infrared, infrared data association (IRDA), near field communications (NFC), RF, and the like. In some embodiments, the communications component 220 also facilitates reception from terrestrial radio networks, digital satellite radio networks, Internet-based radio services networks, combinations thereof, and the like.

The communications component 220 processes data from a network such as, for example, the data network 116, an intranet (e.g., the store network 132), a home broadband network, a Wi-Fi™ hotspot, and the like, via an Internet service provider (ISP), digital subscriber link (DSL) provider, or broadband provider. In some embodiments, the communications component 220 facilitates the transmission of authentication information from the mobile device 200 to a network for processing in accordance with the methods described herein.

The mobile communication device 200 also includes a SIM slot interface 228 for accommodating a SIM 230 such as a SIM card, a universal SIM (USIM) card, or a universal integrated circuit card (UICC) including one or more SIM applications (e.g., ISIM, SIM, USIM, CSIM). In one embodiment, the SIM 230 is configured to store one or more macrocell access IDs, for example, as individual MSISDNs. Alternatively or additionally, the SIM 230 is configured to store one or more femtocell access IDs. In some embodiments, a femtocell access identifier application, such as described above as being stored in the memory 206 as one of the other applications 214 may, additionally or alternatively, be stored in the SIM 230 as a special-purpose SIM application.

Audio capabilities for the mobile communications device 200 may be provided by an audio I/O component 232 that includes a speaker for the output of audio signals and a microphone to collect audio signals.

The mobile communication device 200 may also include an image capture and processing system 234 (image system). Photos may be obtained via an associated image capture subsystem of the image system 234, for example, a charge-coupled device (CCD) or active pixel sensor (APS) camera. The mobile communication device 200 may also include a video system 236 for capturing, processing, recording, modifying, and/or transmitting video content. Photos and videos obtained using the image system 234 and the video system 236, respectively, may be added as message content to an MMS message and sent to another mobile device.

The mobile communication device 200 also includes a location component 238 for sending and/or receiving signals such as, for example, GPS data, assisted GPS (A-GPS) data, Wi-Fi™/Wi-Max™, and/or cellular network triangulation data, combinations thereof, and the like, for determining a location of the mobile communication device 200. The location component 238 may communicate with the communications component 220 to retrieve triangulation data for determining a location. In some embodiments, the location component 238 interfaces with cellular network nodes, telephone lines, satellites, location transmitters and/or beacons, wireless network transmitters and receivers, for example, Wi-Fi™ hotspots, radio transmitters, combinations thereof, and the like. Using the location component 238, the mobile communication device 200 obtains, generates, and/or receives data to identify its location, or transmits data used by other devices to determine the location of the mobile communication device 200.

The mobile communication device 200 also includes a power source 240, such as batteries and/or other power subsystem (AC or DC). The power source 240 may interface with an external power system or charging equipment via a power I/O component 242.

Femtocell Base Station Architecture

Figure 3:
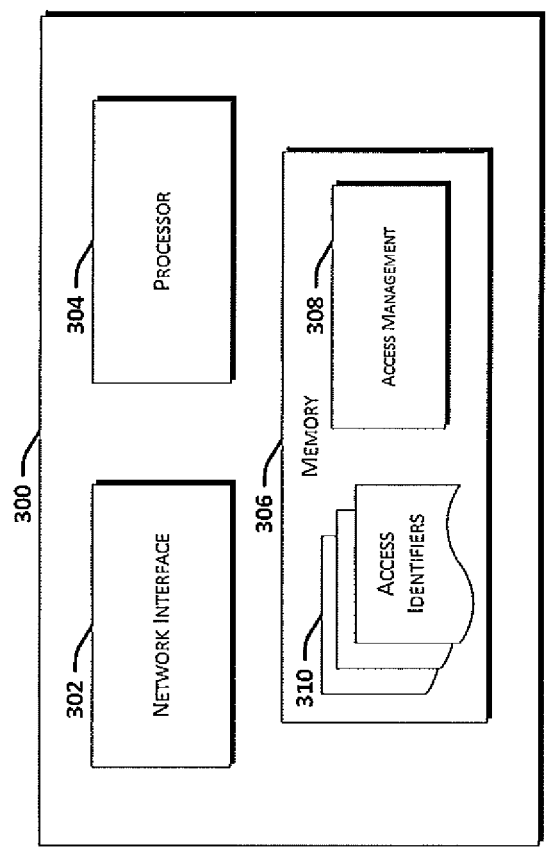
FIG. 3 schematically illustrates an embodiment of a femtocell base station and components thereof.

Referring now to FIG. 3, an exemplary femtocell base station 300 is illustrated. In some embodiments, the femtocell NB 118 illustrated in FIG. 1 is configured like the illustrated femtocell base station 300. Although connections are not shown between the components illustrated in FIG. 3, the components can interact with each other to carry out femtocell base station functions. In some embodiments, for example, the components are arranged so as to communicate via one or more busses (not shown). It should be understood that FIG. 3 and the following description are intended to provide a general understanding of a suitable environment in which various aspects of the disclosed embodiments can be implemented.

The femtocell base station 300 includes a network interface 302 for facilitating communications with the UEs 106, 120, the indoor location infrastructure network 130, the IP access network 123, the femtocell gateway 124 (e.g., via the IP access network 123), the security gateway 126 (e.g., via the IP access network 123), and other systems or network elements of the femtocell network 104.

The femtocell base station 300 also includes one or more processors 304 that are in communication with one or more memory components 306 via one or more memory/data busses (not illustrated). The processor(s) 304 is configured to execute instructions of an access management application 308 stored on a tangible, non-transitory computer-readable medium, such as the illustrated memory component(s) 306. The access management application 308 is configured to manage one or more femtocell access IDs 310, such as the femtocell access IDs stored in the femtocell access ID list 122 (illustrated in FIG. 1). Management of access IDs includes, for example, creation of new femtocell access IDs, deletion of femtocell access IDs, femtocell access ID selection, and other access management tasks, such as those described herein below with reference to FIGS. 4-13.

In alternative embodiments, the access management application 308 resides in the femtocell gateway 124, the security gateway 126, the indoor location infrastructure network 130, one or more store networks 132, the store server 134, the store database 136, or some combination thereof in addition to or in lieu of the access management application 308 being stored in the femtocell base station 300 to perform the access management tasks described herein below. Accordingly, the aforementioned elements may be configured with one or more processor and one or more memory components configured in a like manner as described above for the femtocell base station 300 to perform these tasks.

The term "memory," as used herein to describe the memory component(s) 306, collectively includes all memory types associated with the femtocell base station 300, such as, but not limited to, processor registers, processor cache, random access memory (RAM), other volatile memory forms, and non-volatile, semi-permanent or permanent memory types; for example, tape-based media, tangible optical media, solid state media, hard disks, combinations thereof, and the like. While the memory component(s) 306 is illustrated as residing proximate the processor(s) 304, it should be understood that the memory component(s) 306 is in some embodiments a remotely accessible storage system, such as a memory of the femtocell gateway 124, the store server 134, the store database 136, or another server, database, or storage component of the femtocell network 104, or a storage component accessible via the data network 116 or the core network 114. Moreover, the memory component(s) 306 is intended to encompass network memory and/or other storage devices in wired or wireless communication with the femtocell base station 300.

Femtocell Network Access Management

It should be understood that the steps of the following methods are not necessarily presented in any particular order and that performance of some or all the steps in an alternative order is possible and is contemplated. The steps have been presented in the demonstrated order for ease of description and illustration. Steps can be added, omitted and/or performed simultaneously without departing from the scope of the appended claims. It should also be understood that the illustrated methods can be ended at any time. In certain embodiments, some or all steps of these methods, and/or substantially equivalent steps can be performed by execution of computer-readable instructions stored or included on a non-transitory computer-readable medium of the above-described femtocell base station 300, as in the described embodiments. Alternatively, some or all steps of these methods, and/or substantially equivalent steps can be performed by execution of computer-readable instructions stored or included on a non-transitory computer-readable medium of the femtocell gateway 124, the security gateway 126, the store server 134, the store database 136, or combinations thereof.

Figure 4:
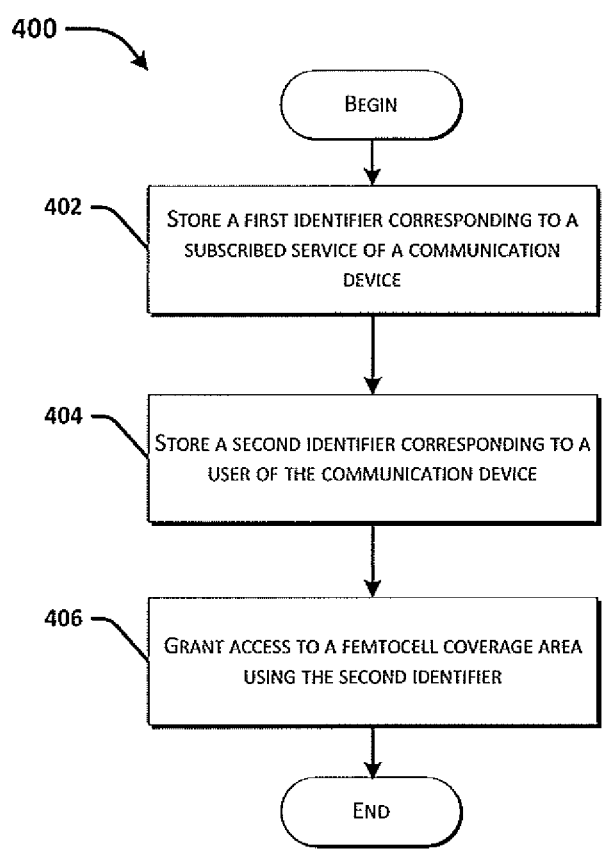
FIG. 4 illustrates an embodiment of a method for managing access to femtocell coverage.

Referring now to FIG. 4, a method 400 for managing access to femtocell coverage provided by the femtocell network 104 is illustrated. The method 400 can be performed, for example, by the femtocell base station 300, the femtocell gateway 124, or other illustrated network elements, where applicable, although the described embodiment focuses on the method 400 being performed by the femtocell base station 300 (e.g., the femtocell NB 118).

The method 400 begins and flow is to step 402, whereat the memory component 306 of the femtocell base station 300 (e.g., the femtocell NB 118) stores a first identifier corresponding to a subscribed service of a communication device (e.g., the UE 106). In one embodiment, the first identifier is a macrocell access ID, such as described above, used to access a subscribed service (e.g., voice, data, and/or messaging) via the UE 106. In some embodiments, the femtocell NB 118 forwards the first identifier to the femtocell gateway 124 for storage in the central femtocell access ID list 128 in association with the UE 106.

At step 404, the memory component 306 stores a second identifier corresponding to a user of the UE 106. The second identifier is a femtocell access ID, such as described above, that is used to access the femtocell network 104.

At step 406, the femtocell NB 118 grants access to the femtocell coverage area, thereby permitting use of the second identifier for communications between the UE 106 and other devices, servers, databases, and the like within the femtocell network 104 instead of the first identifier (e.g., the MSISDN associated with the UE 106). The method 400 can end.

It is contemplated that each first identifier associated with the UE 106 may be associated with multiple second identifiers. That is, if the UE 106 is associated with one or more MSISDNs (e.g., macrocell access IDs), at least one of them may be stored in the femtocell access ID list 122 and/or the central femtocell access ID list 128 and may be associated with at least one second identifier (e.g., femtocell access IDs) that each correspond to a particular user of the UE 106. As such, multiple users (e.g., members of a family) may access the femtocell network 104 via the UE 106 using different femtocell network access identifiers that are particular to each user. Moreover, the femtocell access ID lists 122, 128 can associate each femtocell access ID with multiple UEs. For example, a child may have one or more femtocell access IDs for accessing the femtocell network 104 via a first device corresponding to a first subscribed service of a first parent and via a second device corresponding to a second subscribed service of a second parent. In some instances, the first and second subscribed services are associated with each other, such as by being part of a joint plan (e.g., a family plan).

Figure 5:
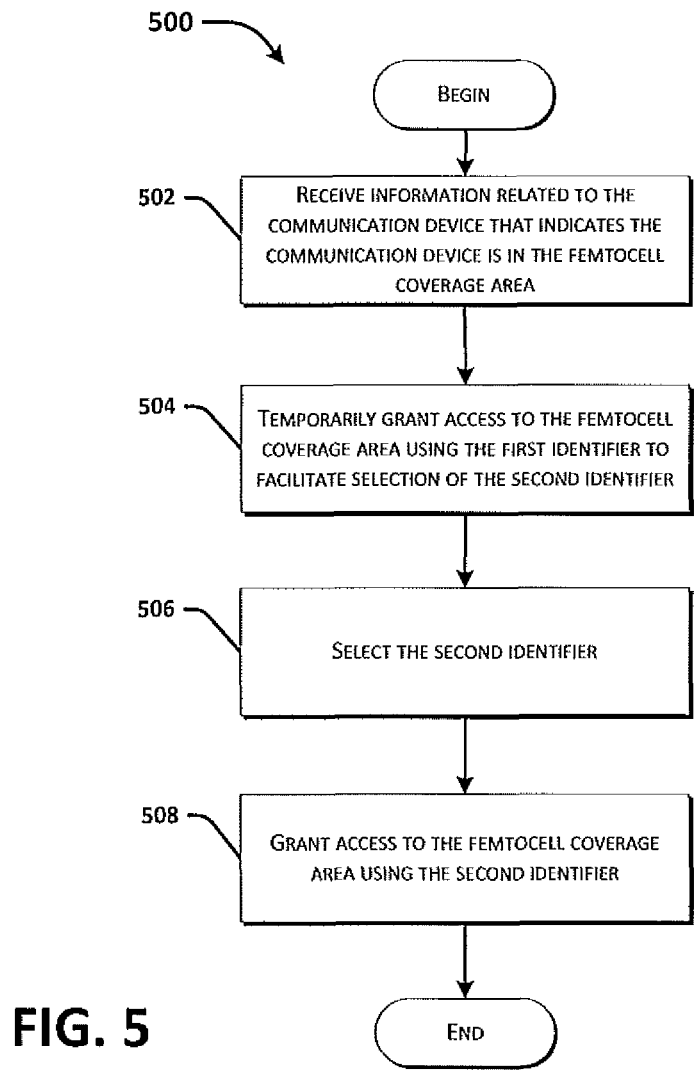
FIG. 5 illustrates another embodiment of a method for managing access to femtocell coverage.

Referring now to FIG. 5, the method 400 described above is modified such that the following steps, in one embodiment, occur prior to storing the first identifier and the second identifier, steps 402 and 404, respectively, of method 400. The method 500 can be performed, for example, by the femtocell NB 118, the femtocell gateway 124, or other illustrated network elements, where applicable, although the described embodiment focuses on the method 500 being performed by the femtocell base station 300 (e.g., the femtocell NB 118).

The method 500 begins and flow is to step 502, whereat the femtocell base station 300 (e.g., the femtocell NB 118) receives information related to the communication device (e.g., the UE 106) that indicates the UE 106 is in the femtocell coverage area of the femtocell network 104. At step 504, the femtocell NB 118 temporarily grants the UE 106 access to the femtocell coverage using the first identifier to facilitate selection (e.g., via a data connection) of the second identifier. At step 506, the femtocell NB 118 selects the second identifier. At step 508, the femtocell NB 118 grants the UE 106 access to the femtocell coverage area using the second identifier. The method 500 can end.

Figure 6:
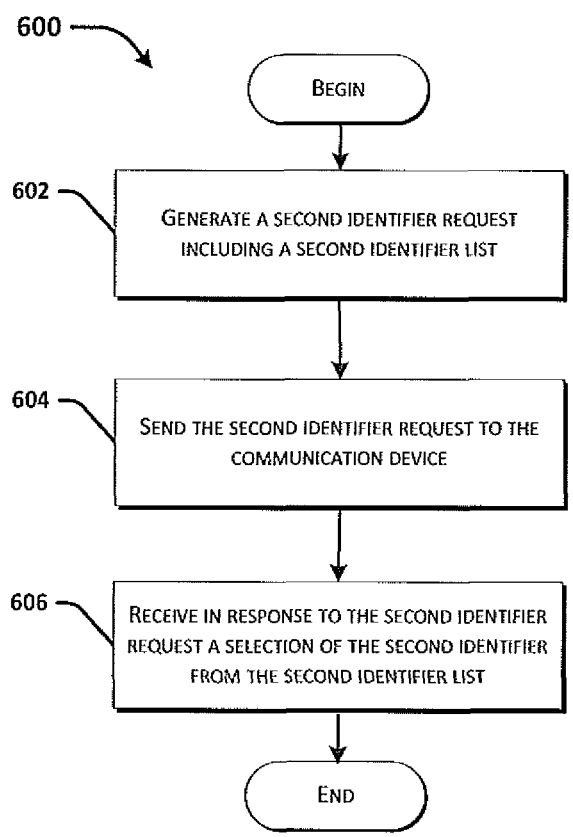
FIG. 6 illustrates an embodiment of a method for selecting a second identifier used to access femtocell coverage.

Referring now to FIG. 6, an embodiment of a method 600 for selecting a second identifier (e.g., the selection step 506 of FIG. 5) is illustrated. The method 400 can be performed, for example, by the femtocell NB 118, the femtocell gateway 124, or other illustrated network elements, where applicable, although the described embodiment focuses on the method 600 being performed by the femtocell base station 300 (e.g., the femtocell NB 118).

The method 600 begins and flow is to step 602, whereat the femtocell NB 118 generates a second identifier request. The second identifier request includes a second identifier list of a plurality of second identifiers for presentation to a user of the communication device (e.g., the UE 106) via audible and/or visual means, such as by presentation on a display of the UE 106 and/or audio output via a speaker of the UE 106.

At step 604, the second identifier request is sent to the UE 106. At step 606, a selection of the second identifier from the second identifier list is received by the femtocell NB 118 in response to the second identifier request. The selection is initiated by a user of the UE 106 or automatically by the UE 106. The method 600 can end, thereby completing the illustrated embodiment of selection step 506.

Figure 7:
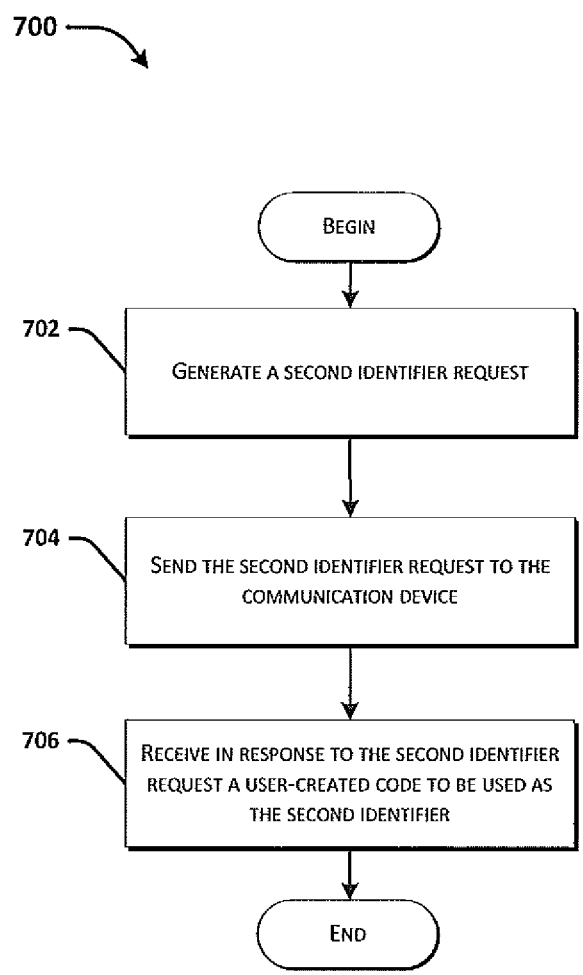
FIG. 7 illustrates another embodiment of a method for selecting a second identifier used to access femtocell coverage.

Referring now to FIG. 7, an embodiment of a method 700 for selecting a second identifier (e.g., the selection step 506 of FIG. 5) is illustrated. The method 700 can be performed, for example, by the femtocell NB 118, the femtocell gateway 124, or other illustrated network elements, where applicable, although the described embodiment focuses on the method 700 being performed by the femtocell base station 300 (e.g., the femtocell NB 118).

The method 700 begins and flow is to step 702, whereat the femtocell base station 300 (e.g., the femtocell NB 118) generates a second identifier request. The second identifier request includes a request for the user of the communication device (e.g., the UE 106) to create a code to be used as the second identifier. The code can consist of one or more alphanumeric and/or symbol characters.

At step 704, the femtocell NB 118 sends the second identifier request to the UE 106. At step 706, the femtocell NB 118 receives in response to the second identifier request a user-created code to be used as the second identifier. The method 700 can end, thereby completing the illustrated embodiment of selection step 506.

Figure 8:
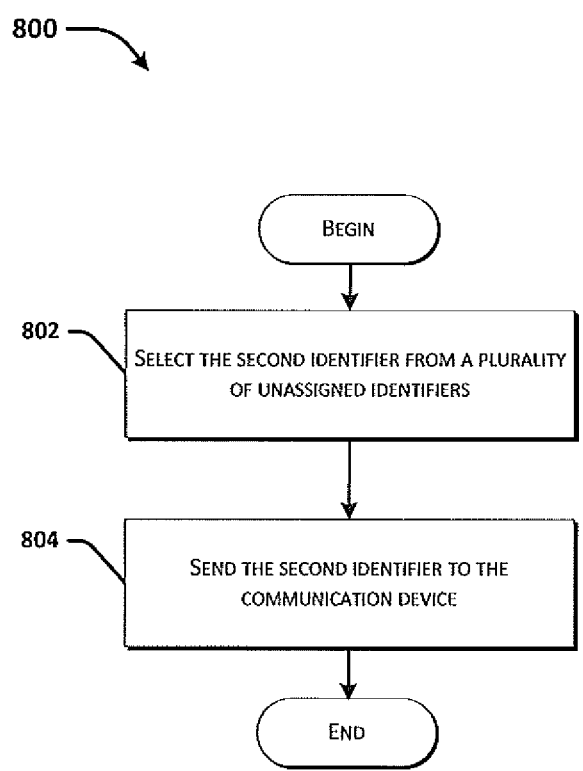
FIG. 8 illustrates yet another embodiment of a method for selecting a second identifier used to access femtocell coverage.

Referring now to FIG. 8, another embodiment of a method 800 for selecting a second identifier (e.g., the selection step 506 of FIG. 5) is illustrated. The method 800 can be performed, for example, by the femtocell NB 118, the femtocell gateway 124, or other illustrated network elements, where applicable, although the described embodiment focuses on the method 800 being performed by the femtocell base station 300 (e.g., the femtocell NB 118).

The method 800 begins and flow is to step 802, whereat the femtocell base station 300 (e.g., the femtocell NB 118) selects a second identifier from a plurality of unassigned identifiers stored in the memory component 306 and allocated for assignment to UEs for access to the femtocell network 104. In one embodiment, the plurality of unassigned identifiers is generated by an MNO associated with the femtocell network 104. In another embodiment, the plurality of unassigned identifiers is generated by a first establishment associated with the femtocell network 104. In yet another embodiment, the plurality of unassigned identifiers is generated by a second establishment associated with the first establishment, such as a store associated with a multi-store/vendor establishment like a mall. In still other embodiments, a first allocation of unassigned identifiers is allocated by one of the above entities and a second allocation of unassigned identifiers is allocated by another of the above entities. Further granularity of unassigned identifier allocation by various entities is contemplated.

At step 804, the femtocell NB 118 sends the selected second identifier to the communication device (e.g., the UE 106). The method 800 can end, thereby completing the illustrated embodiment of selection step 506.

Figure 9:
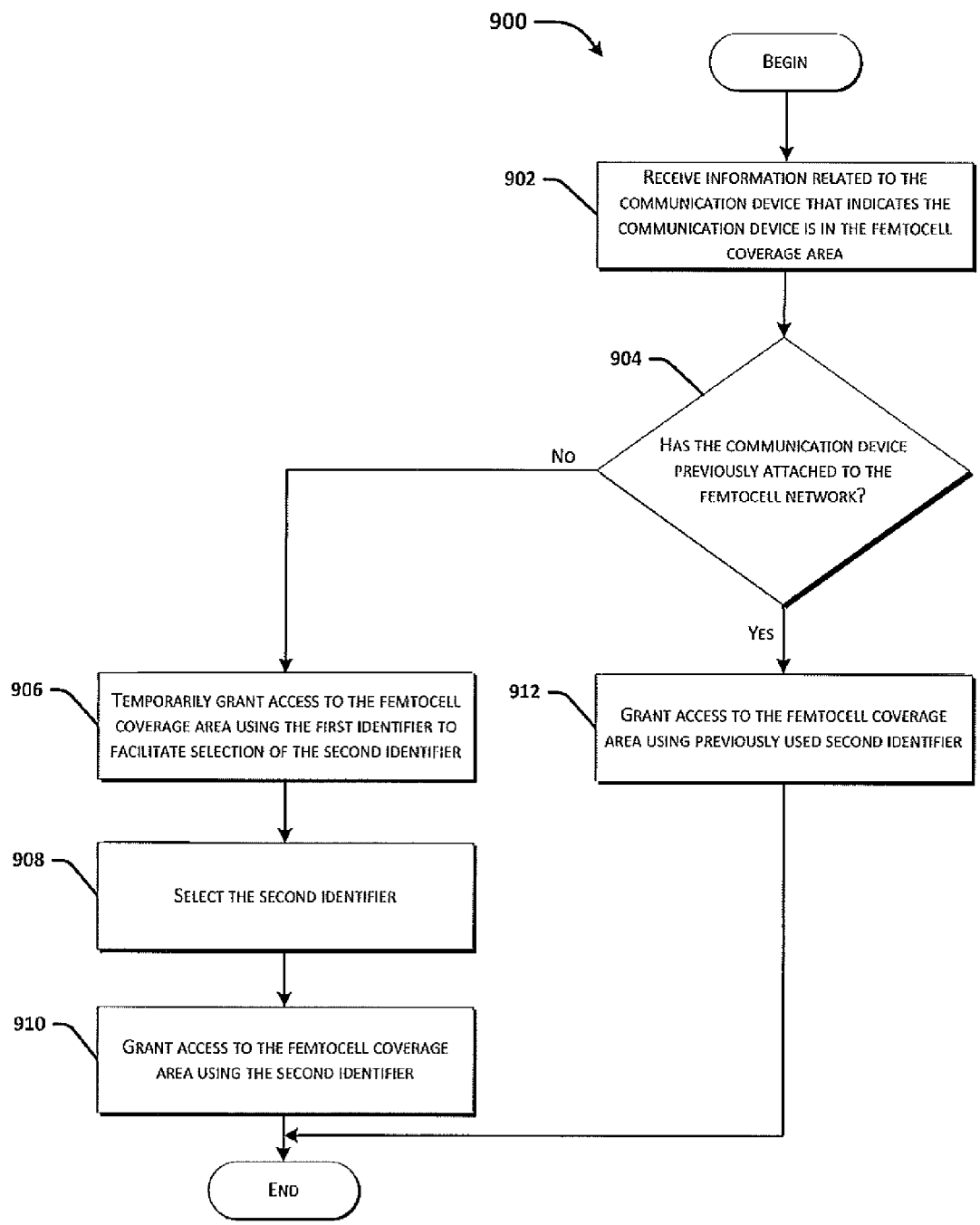
FIG. 9 illustrates yet another embodiment of a method for managing access to femtocell coverage.

Referring now to FIG. 9, an embodiment of a method 900 for managing access to femtocell coverage is illustrated. The method 900 can be performed, for example, by the femtocell NB 118, the femtocell gateway 124, or other illustrated network elements, where applicable, although the described embodiment focuses on the method 900 being performed by the femtocell base station 300 (e.g., the femtocell NB 118).

The method 900 begins and flow is to step 902, whereat the femtocell base station 300 (e.g., the femtocell NB 118) receives information related to the communication device (e.g., the UE 106) that indicates the UE 106 is in the femtocell coverage area of the femtocell network 104. At step 904, the femtocell NB 118 determines whether the UE 106 has previously attached to the femtocell network 104. If the UE 106 has never previously attached to the femtocell network 104, then flow is to step 906. Alternatively, if the UE 106 has previously attached to the femtocell network 104 but the previous attach was greater than a specified time threshold, then flow is also to step 906. For example, a user may be required to access the femtocell network 104 subsequent to a prior access within the specified time threshold to prevent having to select a new second identifier. The specified time threshold may be defined by the user, the operator of the femtocell network 104, an establishment, or other entity. The specified time threshold may be any length and may be defined in any number of seconds, minutes, hours, days, weeks, months, and/or years.

At step 906, the femtocell NB 118 temporarily grants the UE 106 access to the femtocell coverage using the first identifier to facilitate selection of the second identifier. At step 908, the femtocell NB 118 selects the second identifier via any of the above-described methods. At step 910, the femtocell NB 118 grants access to the femtocell coverage area using the second identifier. The method 900 can end.

If, at step 904, it is determined that the UE 106 has previously attached to the femtocell network 104, then flow is to step 912. At step 912, the femtocell NB 118 grants access to the femtocell coverage area using the second identifier that is associated with the UE 106 in, for example, the femtocell access ID list 122. The method 900 can end.

In some embodiments, the UE 106 is associated with multiple femtocell access IDs. In these embodiments, the femtocell NB 118 can prompt the user to select which of the multiple femtocell access IDs the user desires to use for the present communication session. In one such embodiment, the femtocell NB 118 selects one of the multiple femtocell access IDs randomly. In another such embodiment, the femtocell NB 118 selects one of the multiple femtocell access IDs based upon one or more user preferences stored at the femtocell NB 118 (e.g., in the femtocell access ID list 122 or elsewhere in the memory component(s) 306). User preferences include, but are not limited to, time preferences (e.g., time of day, day of week, day of month, month, and the like) and store preferences (e.g., a first femtocell access ID for a first store, a second femtocell access ID for a second store, and so on).

In yet another such embodiment, the femtocell NB 118 receives, without request, a selected femtocell access ID from the UE 106. That is, the femtocell NB 118 recognizes the UE 106 and sometime thereafter receives a selected femtocell access ID from the UE 106. Moreover, in this particular embodiment, the femtocell NB 118 can check the selected femtocell access ID received from the UE 106 to determine if it is a permitted femtocell access ID (i.e., the selected femtocell access ID is included in the femtocell access ID list 122 as being associated with the UE 106). In still another such embodiment, the femtocell NB 118 generates a second identifier request including a second identifier list. The second identifier list, in this embodiment, includes all or a portion of the multiple femtocell access IDs available for selection. The femtocell NB 118 sends the second identifier request to the UE 106 and, in response, receives a selection of one of the multiple femtocell access IDs presented in the list. Other methods of selecting from the multiple femtocell access IDs are contemplated.

Figure 10:
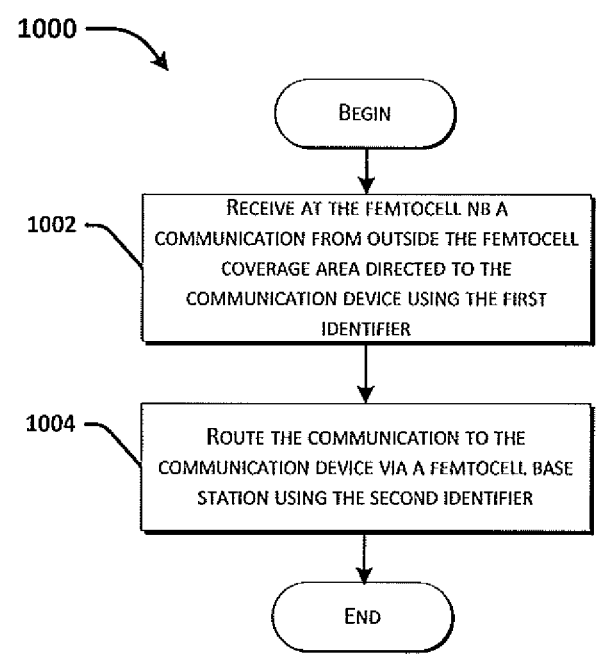
FIG. 10 illustrates an embodiment of a method for routing a communication from outside femtocell coverage to a communication device via a femtocell base station within the femtocell coverage using a second identifier.

Referring now to FIG. 10, an embodiment of a method 1000 for routing a communication from outside femtocell coverage to a communication device via a femtocell base station within the femtocell coverage using a second identifier is illustrated. The method 1000 can be performed, for example, by the femtocell base station 300, the femtocell gateway 124, or other illustrated network elements, where applicable, although the described embodiment focuses on the method 1000 being performed by the femtocell base station 300 (e.g., the femtocell NB 118).

The method 1000 begins and flow is to step 1002, whereat the femtocell base station 300 (e.g., the femtocell NB 118) receives a communication (e.g., voice, data, and/or messaging) from outside femtocell coverage of the femtocell network 104. The communication is directed to a communication device (e.g., the UE 106) using a first identifier (e.g., a macrocell access ID of the UE 106). At step 1004, the femtocell NB 118 routes the communication to the UE 106 using a second identifier of the UE 106 (e.g., a femtocell access ID of the UE 106). The method 1000 can end.

Figure 11:
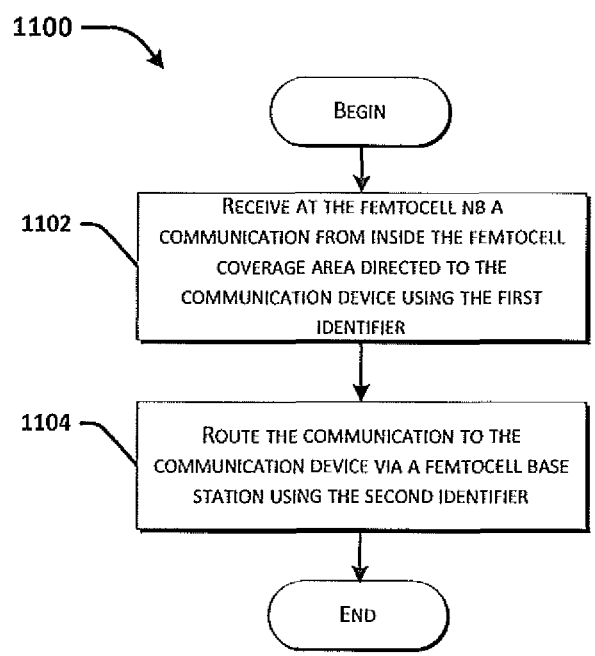
FIG. 11 illustrates an embodiment of a method for routing a communication from inside femtocell coverage to a communication device via a femtocell base station within the femtocell coverage using a second identifier.

Referring now to FIG. 11, an embodiment of a method 1100 for routing a communication from inside femtocell coverage to a communication device via a femtocell base station within the femtocell coverage using a second identifier is illustrated. The method 1100 can be performed, for example, by the femtocell base station 300, the femtocell gateway 124, or other illustrated network elements, where applicable, although the described embodiment focuses on the method 1100 being performed by the femtocell base station 300 (e.g., the femtocell NB 118).

The method 1100 begins and flow is to step 1102, whereat the femtocell base station 300 (e.g., the femtocell NB 118) receives a communication (e.g., voice, data, and/or messaging) from inside femtocell coverage of the femtocell network 104. The communication is directed to a communication device (e.g., the UE 106) using a first identifier (e.g., a macrocell access ID of the UE 106). At step 1104, the femtocell NB 118 routes the communication to the UE 106 using a second identifier (e.g., a femtocell access ID of the UE 106). The method 1100 can end.

Figure 12:
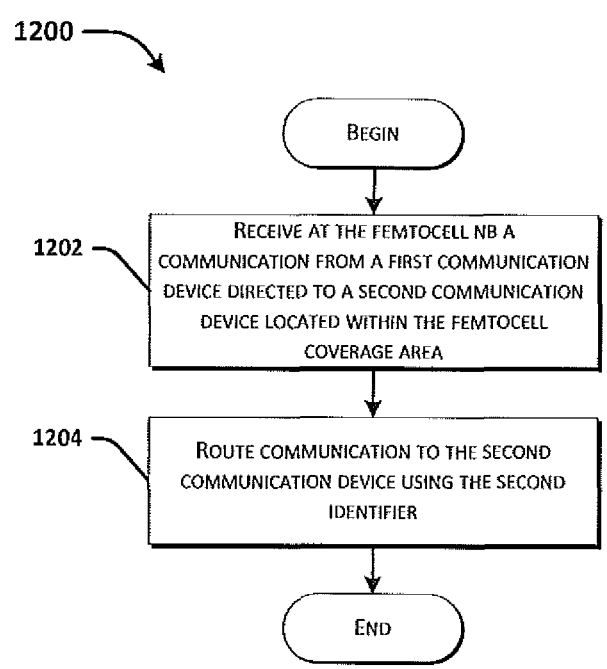
FIG. 12 illustrates an embodiment of a method for routing a communication from a first communication device directed to a second communication device using a second identifier, wherein both devices are located within femtocell coverage.

Referring now to FIG. 12, an embodiment of a method 1200 for routing a communication from a first communication device directed to a second communication device using a second identifier, wherein both devices are located within femtocell coverage is illustrated. The method 1200 can be performed, for example, by the femtocell base station 300, the femtocell gateway 124, or other illustrated network elements, where applicable, although the described embodiment focuses on the method 1200 being performed by the femtocell base station 300 (e.g., the femtocell NB 118).

The method 1200 begins and flow is to step 1202, whereat the femtocell base station 300 (e.g., the femtocell NB 118) receives a communication (e.g., voice, data, and/or messaging) from a first communication device (e.g., the UE 106) that is directed to a second communication device (e.g., the UE 120). In an alternative embodiment, the communication from the UE 106 is directed to the store network 132 or, for example, particularly to the store server 134 or the store database 136. At step 1204, the femtocell NB 118 routes the communication to the second communication device using the second identifier. In one embodiment, the second identifier is presented audibly and/or visually to the second communication device, such as for caller identification purposes to prevent the second communication device from being privy to the first identifier (e.g., the macrocell access ID/MSISDN of the UE 106). The method 1200 can end.

Figure 13:
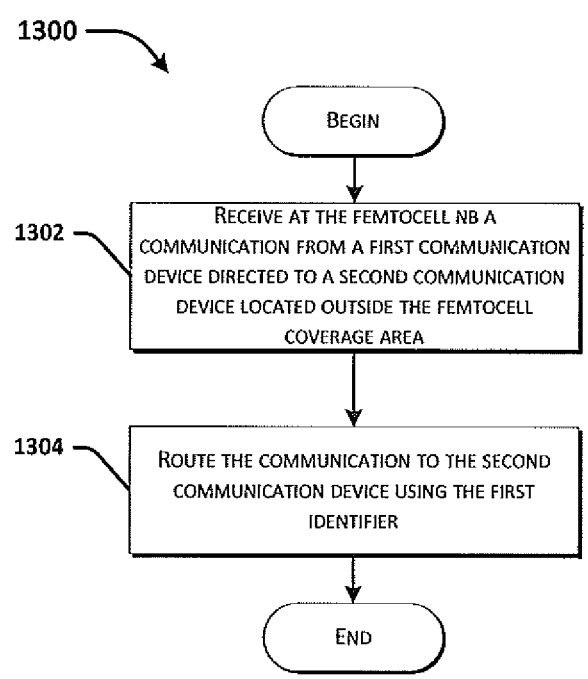
FIG. 13 illustrates an embodiment of a method for routing a communication from a first communication device directed to a second communication device using a second identifier, wherein the first communication device is located within femtocell coverage and the second communication device is located outside the femtocell coverage.

Referring now to FIG. 13, an embodiment of a method 1300 for routing a communication from a first communication device directed to a second communication device using a second identifier, wherein the first communication device is located within the femtocell coverage and the second communication device is located outside the femtocell coverage is illustrated. The method 1300 can be performed, for example, by the femtocell base station 300, the femtocell gateway 124, or other illustrated network elements, where applicable, although the described embodiment focuses on the method 1300 being performed by the femtocell base station 300 (e.g., the femtocell NB 118).

The method 1300 begins and flow is to step 1302, whereat the femtocell base station 300 (e.g., the femtocell NB 118) receives a communication (e.g., voice, data, and/or messaging) from a first communication device (e.g., the UE 106) that is directed to a second communication device (e.g., the UE 108). At step 1304, the femtocell NB 118 routes the communication to the second communication device using the first identifier. The method 1300 can end.

The law does not require and it is economically prohibitive to illustrate and teach every possible embodiment of the present claims. Hence, the above-described embodiments are merely exemplary illustrations of implementations set forth for a clear understanding of the principles of the disclosure. Variations, modifications, and combinations may be made to the above-described embodiments without departing from the scope of the claims. All such variations, modifications, and combinations are included herein by the scope of this disclosure and the following claims.

What is claimed is:

1. A method, for managing access to a femtocell, comprising:
   granting, by a system having a processor, using a first identifier corresponding to a service to which a communication device is subscribed, a communication device temporary access to the femtocell being associated with a femtocell coverage area, to facilitate obtaining of a second identifier;
   obtaining, by the system, during the temporary access, the second identifier, the second identifier corresponding to the communication device; and
   granting, by the system, the communication device access to the femtocell using the second identifier;
   wherein obtaining the second identifier includes an operation selected from a group consisting of:
      generating a second identifier request including a second-identifier list, sending the second-identifier request to the communication device, wherein the second-identifier request is routed to the communication device using the first identifier, and receiving, in response to the second-identifier request, a second-identifier response comprising a selection of the second identifier, wherein the selection is of a specific identifier selected from the second-identifier list;
      generating a second identifier request including a second-identifier list, sending the second-identifier request to the communication device, wherein the second-identifier request is routed to the communication device using the first identifier, and receiving, in response to the second-identifier request, a second-identifier response comprising a user-created code, comprising an alphanumeric character, to be used as the second identifier; and
      selecting the second identifier from a plurality of unassigned identifiers which are generated by at least one entity selected from a group consisting of a mobile network operator associated with the femtocell coverage area, a first establishment associated with the femtocell coverage area, and a second establishment associated with the first establishment.

2. The method of claim 1, wherein the mobile network operator associated with the femtocell coverage area is a provider of the service to the communication device.

3. The method of claim 1, wherein the first establishment provides the femtocell coverage area independent of the mobile network operator.

4. The method of claim 1, wherein the first establishment is a shopping mall and the second establishment is a particular establishment within the mall.

5. The method of claim 4, wherein the second identifier provides a first femtocell access identification corresponding to a user of the communication device for communicating with at least one entity selected from a group consisting of the first establishment and the second establishment.

6. The method of claim 1, further comprising obtaining, by the system, a third identifier, wherein:
   the second identifier provides a first femtocell access identification corresponding to a user of the communication device, for communicating with a first establishment; and
   the third identifier provides a second femtocell access identification corresponding to the user of the communication device, for communicating with a second establishment.

7. The method of claim 6, wherein the first establishment and the second establishment are located within a multi-establishment facility.

8. The method of claim 1, wherein the communication device is associated with a first user and granting access to the femtocell using the second identifier comprises granting access to the femtocell for communications originating from and terminating within the femtocell coverage area.

9. The method of claim 1, wherein the communication device is associated with a first user and granting access to the femtocell using the second identifier comprises granting access to the femtocell for communications originating from within the femtocell coverage area and terminating external to the femtocell coverage area.

10. The method of claim 1, wherein:
    the communication device is a first communication device;
    granting access to the femtocell using the second identifier comprises facilitating local routing of communications between the first communication device and a second communication device located within the femtocell coverage area; and the local routing of the communications occurs within the femtocell coverage area, and the second identifier is used for the local routing.

11. The method of claim 1, wherein:

the communication device is a first communication device;

granting access to the femtocell using the second identifier comprises facilitating external routing of communications between the first communication device and a second communication device located within the femtocell coverage area; and the external routing of the communications occurs using an external network and the first identifier is used for the external routing.

12. The method of claim 1, wherein:

the method further comprises receiving, by the system, information indicating that the communication device is in the femtocell coverage area associated with the femtocell; and granting access using the first identifier is performed in response to receiving the information.

13. A femtocell access system, for managing access to a femtocell, comprising:

a processor; and a computer-readable medium in communication with the processor and having instructions that, when executed by the processor, cause the processor to perform operations comprising:

granting, using a first identifier corresponding to a service to which a communication device is subscribed, the communication device temporary access to the femtocell, being associated with a femtocell coverage area, to facilitate obtaining of a second identifier;

obtaining, during the temporary access, the second identifier, the second identifier corresponding to the communication device; and granting the communication device access to the femtocell using the second identifier;

wherein the operation of obtaining the second identifiers comprises an act selected from a group consisting of:

generating a second identifier request including a second-identifier list, sending the second-identifier request to the communication device, wherein the second-identifier request is routed to the communication device using the first identifier, and receiving, in response to the second-identifier request, a second-identifier response comprising a selection of the second identifier, wherein the selection is of a specific identifier selected from the second-identifier list;

generating a second identifier request including a second-identifier list, sending the second-identifier request to the communication device, wherein the second-identifier request is routed to the communication device using the first identifier, and receiving, in response to the second-identifier request, a second-identifier response comprising a user-created code, comprising an alphanumeric character, to be used as the second identifier; and selecting the second identifier from a plurality of unassigned identifiers which are generated by at least one entity selected from a group consisting of a mobile network operator associated with the femtocell coverage area, a first establishment associated with the femtocell coverage area, and a second, establishment associated with the first establishment.

14. The femtocell access system of claim 13, wherein granting access to the femtocell using the second identifier comprises a granting operation selected from a group consisting of:

granting access to the femtocell for communications originating from and terminating within the femtocell coverage area;

granting access to the femtocell for communications originating from within the femtocell coverage area and terminating external to the femtocell coverage area;

facilitating local routing of communications between the communication device and another device, wherein:

the communication device is a first communication device;

granting access to the femtocell using the second identifier comprises facilitating local routing of communications between the communication device and a second communication device located within the femtocell coverage area; and the local routing of the communications occurs within the femtocell coverage area, and the second identifier is used for the local routing; and facilitating external routing of communications between the communication device and the second communication device located within the femtocell coverage area, wherein:

granting access to the femtocell using the second identifier comprises facilitating external routing of communications between the first communication device and a second communication device located within the femtocell coverage area; and the external routing of the communications occurs using an external network and the first identifier is used for the external routing.

15. A computer-readable storage device comprising computer-executable instructions that, when executed by a processor, cause the processor to perform operations comprising:

granting, using a first identifier corresponding to a service to which a communication device is subscribed, the communication device temporary access to the femtocell, being associated with a femtocell coverage area to facilitate obtaining of a second identifier;

obtaining, during the temporary access, the second identifier, the second identifier corresponding to the communication device; and granting the communication device access to the femtocell using the second identifier wherein the operation of obtaining the second identifier comprises an act selected from a group consisting of:

generating a second identifier request including a second-identifier list, sending the second-identifier request to the communication device, wherein the second-identifier request is routed to the communication device using the first identifier, and receiving, in response to the second-identifier request, a second-identifier response comprising a selection of the second identifier, wherein the selection is of a specific identifier selected from the second-identifier list;

generating a second identifier request including a second-identifier list, sending the second-identifier request to the communication device, wherein the second-identifier request is routed to the communication device using the first identifier, and receiving, in response to the second-identifier request, a second-identifier response comprising a user-created code, comprising an alphanumeric character, to be used as the second identifier; and selecting the second identifier from a plurality of unassigned identifiers which are generated by at least one entity selected from a group consisting of a mobile network operator associated with the femtocell coverage area, a first establishment associated with the femtocell coverage area, and a second establishment associated with the first establishment.

16. The femtocell access system of claim 13, wherein:
the operations further comprise receiving information indicating that the communication device is in the femtocell coverage area associated with the femtocell; and
the operation of granting access using the first identifier is performed in response to receiving the information.

17. The computer-readable storage device of claim 15, wherein:
the operations further comprise receiving information indicating that the communication device is in the femtocell coverage area associated with the femtocell; and
the operation of granting access using the first identifier is performed in response to receiving the information.

* * * * *